United States Patent [19]

Spencer et al.

[11] Patent Number: 5,078,173
[45] Date of Patent: Jan. 7, 1992

[54] DROOP COMPENSATED BYPASS VALVE

[75] Inventors: William R. Spencer, Springdale; Elias L. Levine, Cincinnati, both of Ohio

[73] Assignee: General Electric Company, Cincinnati, Ohio

[21] Appl. No.: 715,264

[22] Filed: Jun. 14, 1991

[51] Int. Cl.$^5$ .............................................. G05D 7/01
[52] U.S. Cl. ................................................ 137/117
[58] Field of Search ........................ 137/117, 115, 116

[56] References Cited

U.S. PATENT DOCUMENTS

| | | |
|---|---|---|
| Re. 25,391 | 5/1963 | Farkas . |
| 2,917,067 | 12/1959 | Pearl . |
| 2,934,138 | 4/1960 | Warne . |
| 3,106,934 | 10/1963 | Rogers et al. . |
| 3,128,783 | 4/1964 | Cowles et al. . |
| 3,465,778 | 9/1969 | Kast . |
| 3,532,106 | 10/1970 | Greune et al. . |
| 4,343,324 | 8/1982 | Ohe .................................... 137/117 |
| 4,458,713 | 7/1984 | Wernberg . |
| 4,505,293 | 3/1985 | Strange ............................... 137/117 |
| 4,724,919 | 2/1988 | Adams ............................ 137/117 X |

*Primary Examiner*—Alan Cohan
*Attorney, Agent, or Firm*—Jerome C. Squillaro

[57] ABSTRACT

A droop compensated bypass valve for use with a metering system having a high pressure fluid supply line, a metering valve connected to the high pressure supply line, and a low pressure supply line connected to the metering valve. The bypass valve includes a body defining a valve chamber, a piston slidably mounted in the valve chamber and including a head dividing the chamber into high and low pressure volumes, the high pressure volume being connected to the high pressure fluid supply line and the low pressure volume being connected to the low pressure supply line. The valve body includes a bypass line connecting the high pressure volume to a low pressure fluid source. A spring urges the piston toward the high pressure volume against high pressure fluid pressure from the high pressure line to cover and progressively shut off the bypass line. The piston includes an orifice therethrough connecting the high and low pressure volumes, and a diaphragm, connected to the spring, which deflects as the piston is displaced toward the low pressure volume thereby progressively closing the piston orifice such that a pressure diferential across the piston varies with the spring force exerted against the piston, thereby compensating for variations in the force applied by the spring as the piston changes position in the chamber.

8 Claims, 1 Drawing Sheet

DROOP COMPENSATED BYPASS VALVE

BACKGROUND OF THE INVENTION

The present invention relates to metering systems and, more particularly, to metering systems having a bypass valve which compensates for fluctuations in fluid supply pressure to maintain a constant pressure drop across a metering valve of the system.

Fluid supply systems such as, for example, fuel supply systems for gas turbine aircraft engines, include a positive displacement pump which generates a relatively high line pressure, a metering valve, and a relatively low pressure supply line extending between the valve and the fuel injectors of the gas turbine engine. With such a system, it is necessary that the pressure differential across the metering valve (metering head) be held constant so that fuel flow is proportional to the controlled metering area of the valve. However, variations in the system during engine operation may cause fluctuations in the pressure of fuel supplied to the metering valve.

Accordingly, such systems include a bypass valve which is responsive to variations in pressure of the fuel in the high pressure supply line, and accordingly "bleeds off" fluid from the high pressure supply line back to a fuel supply upstream of the fuel pump. A typical bypass valve includes a valve body housing a piston which divides a valve chamber into high and low pressure volumes connected to receive fuel from the high and low pressure supply lines, respectively. A reference spring in the low pressure volume urges against the piston to oppose the force exerted on the piston by the high pressure fuel in the high pressure volume.

The bypass valve includes a bypass port communicating with the high pressure volume and connected to a bypass line which in turn is connected upstream of the pump. Should the fuel pressure in the high pressure line increase, the piston in the bypass valve is displaced toward the low pressure volume, progressively uncovering the bypass port which dumps fuel from the high pressure volume and line to reduce the pressure. A disadvantage with such a valve is that the reference spring force varies with the amount of compression of the spring. In order to compensate for this variation, the pressure differential across the piston must decrease as the piston moves to close the bypass port. Such a variation in pressure differential is called "droop." Metering valves with two input motions, such as translation and rotation, generally cannot be modified to compensate for metering head droop.

Attempts have been made to modify the design of the bypass valve to compensate for droop. An example of such a system is disclosed in Wernberg U.S. Pat. No. 4,458,713. That patent discloses a bypass type differential pressure regulator in which an annular pressure chamber is formed between the valve housing and the piston, and is in fluid communication with a chamber within the piston that communicates with the high pressure volume through a restrictive orifice. As the piston is displaced toward the low pressure volume to uncover the high pressure bypass port progressively, the pressure drop resulting from flow through the orifice into the piston chamber reduces the pressure transmitted to the chamber and thereby reduces the total force acting to displace the piston toward the high pressure volume. As bypass flow increases, this pressure becomes progressively less so as to offset the progressively increasing spring force.

A disadvantage with such systems is that a number of orifices required creates a higher likelihood of clogging and performance out of a desired range. Further, such devices require highly complex pistons and seals which add significantly to the overall cost. Accordingly, there is a need for a bypass-type differential pressure regulator which is relatively simple in construction and yet provides reliable performance.

SUMMARY OF THE INVENTION

The present invention is a droop compensated bypass valve which is used with a fluid metering system having a high pressure fluid supply line connected to a metering valve and a low pressure fluid supply line connected downstream of the metering valve. The invention includes a valve body having a valve chamber, a piston slidably mounted in the valve chamber dividing the chamber into high and low pressure volumes, a reference spring urging the piston head into the high pressure volume, high and low pressure lines connecting the high and low pressure volumes to the high and low pressure supply lines, respectively. The high pressure bypass line which is connected to the high pressure volume and is progressively covered by the piston as it moves within the valve chamber.

The piston includes an orifice connecting the high and low pressure volumes, and a flexible diaphragm connected to the spring and positioned to be deflected by increasing spring force to progressively cover the orifice and thereby increasing the pressure differential across the piston as the piston is displaced toward the low pressure volume. Conversely, when the high pressure bypass port is covered by the piston and the spring is extended, the diaphragm deflects away form the piston orifice to open the orifice and decrease the fluid pressure differential across the piston. Consequently, droop compensation is effected since the pressure differential varies with reference spring force.

In a preferred embodiment, the diaphragm includes an adjusting screw which is displacable relative to the diaphragm and therefore varies the clearance between the diaphragm and the piston orifice. Consequently, the bypass valve can be set to progressively cover and uncover the high pressure bypass line port and provide a constant pressure drop across the metering valve for a variety of applications and pressure differentials.

Accordingly, it is an object of the present invention to provide a droop compensated bypass valve which provides a constant pressure drop across an associated metering valve of a fluid supply system; a bypass valve which is relatively simple in construction and is easy to maintain; and a bypass valve which is relatively inexpensive to manufacture and can be adjusted to provide for accurate operation in a variety of environments.

Other objects of the invention will be apparent from the following description, the accompanying drawings and the appended claims.

DETAILED DESCRIPTION

Figure 1:
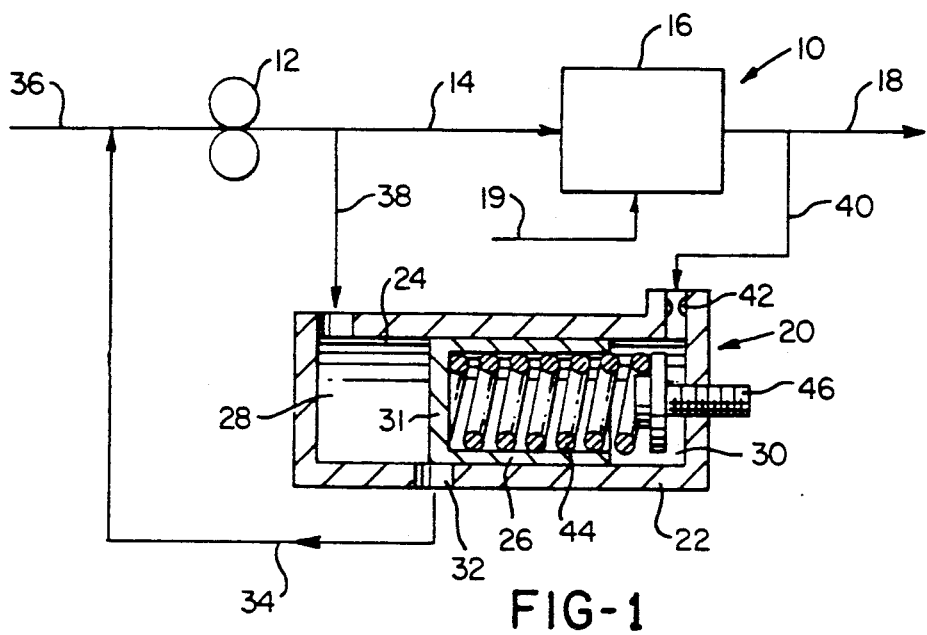
FIG. 1 is a somewhat schematic view of a fluid metering system incorporating a bypass valve of the prior art, the bypass valve being shown in section.

As shown in FIG. 1, a fluid metering system of the prior art, generally designated 10, includes a positive displacement fluid pump 12, high pressure supply line 14, servo-controlled metering valve 16, and low pressure supply line 18. Such a system 10 may comprise a fuel feed system for an aircraft gas turbine engine, in which case a manifold for burner nozzles (not shown) would be connected at a downstream end of line 18. The pump 12 develops a relatively high fluid pressure which is conveyed by line 14 to metering valve 16. Valve 16 meters fluid flow in response to an input control signal through line 19, to the desired low pressure and the low pressure is conveyed through line 18 to an engine (not shown).

The prior art bypass valve, generally designated 20, includes a valve body 22 defining an interior chamber 24. The interior chamber 24 houses a piston 26 which divides the chamber into a high pressure volume 28 and a low pressure volume 30. The piston head is positioned to progressively uncover a high pressure bypass port 32 connected to a high pressure bypass line 34 that, in turn, is connected to low pressure line 36 upstream of pump 12. A high pressure valve line 38 connects the high pressure supply line 14 with the high pressure volume 28. Similarly, a low pressure valve line 40 connects the low pressure supply line 18 with the low pressure volume 30 and includes a restrictive orifice 42.

A reference coil spring 44 is positioned within the low pressure volume 30 and is seated against an adjusting screw 46 at one end and urges against the head 31 of the piston at an opposite end. High pressure fluid entering volume 28 through line 38 urges against piston 26, and is opposed by low pressure fluid entering low pressure volume 30 through line 40. As the high pressure fluid within volume 28 displaces the piston 26, spring 44 is compressed and orifice 32 is progressively exposed, allowing fluid to be dumped through line 34 to supply line 36.

A disadvantage with this system is that, as the piston 26 is displaced toward the low pressure volume 30, the force exerted by the spring 44 in response to the piston 31 displacement increases with each successive incremental displacement, resulting in a system in which the pressure drop across the metering valve 16 is not held constant.

Figure 2:
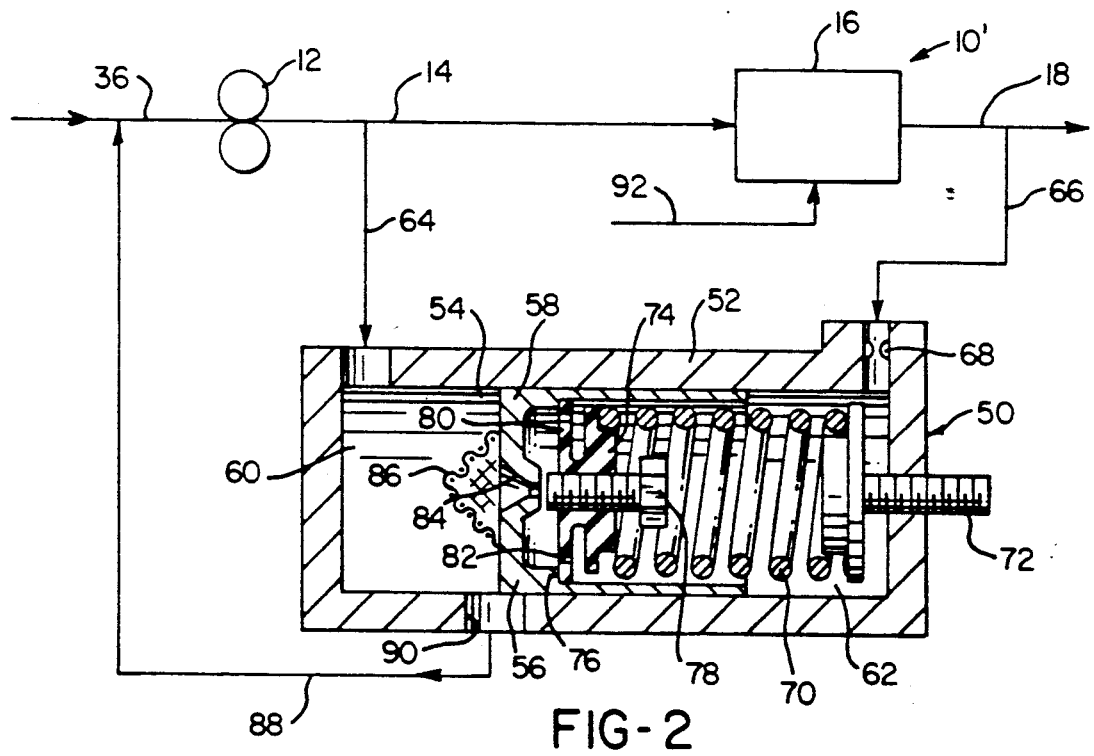
FIG. 2 is a somewhat schematic view of a fluid metering system incorporating a bypass valve of the present invention in which the bypass valve is shown in section.

As shown in FIG. 2, the bypass valve system of the present invention, generally designated 50, includes a valve body 52 having an interior chamber 54 housing a piston 56 for slidable movement. The piston 56 includes a head 58 which divides the chamber 54 into high and low pressure volumes 60, 62 respectively. High pressure volume 60 is connected by high pressure valve line 64 to high pressure supply line 14 and low pressure volume 62 is connected by low pressure valve line 66 to low pressure supply line 18. Low pressure valve line 66 includes an orifice 68 which is sufficiently restrictive such that pressure changes within low pressure volume 62 are not immediately compensated for by fluid supplied through line 66.

A coil compression reference spring 70 is seated against an adjustment screw 72 which, in turn, is threaded into valve body 52, and urges against a flexible diaphragm 74. Diaphragm 74 is seated against an annular shoulder 76 formed in the piston head 58 and includes a central adjusting screw 78. The diaphragm 74 is generally cylindrical in shape and includes a forward wall 80 having a plurality of orifices 82 spaced in a circular pattern concentric with screw 78 to allow unrestricted fluid movement through the diaphragm. The adjusting screw 78 is positioned adjacent a restrictive orifice 84 formed in the piston head and can be advanced toward and away from the orifice to provide a desired amount of clearance with the orifice, thereby varying the effective size of the orifice. A protective chip screen catcher 86 is positioned over the orifice 84.

A high pressure bypass line 88 is connected to the valve body 52 at a high pressure bypass port 90 at one end and to the low pressure supply line 36, upstream of pump 12, at its opposite end.

The operation of the system 10' and bypass valve 50 of the present invention is as follows. The pump 12 generates a high pressure fluid flow through high pressure supply line 14 to metering valve 16 which is preset by an input signal through control line 92 to provide a predetermined flow rate dependent upon a pressure differential across the metering valve. Accordingly, low pressure feed line 18 conveys fluid at a pressure lower than that of high pressure feed line 14 to, for example, a burner manifold (not shown).

The fluid in high pressure supply line 14 flows through high pressure valve line 64 to high pressure volume 60 in valve 50, where it applies a force over the face of piston head 58 to urge the piston 56 into the low pressure volume 62. This force is opposed by the force of spring 70 combined with the pressure force of the low pressure fluid supplied through low pressure supply line 66 from low pressure feed line 18.

If the pressure within the high pressure volume 60 is greater than a predetermined value (which would correspond to excessive pressure within high pressure supply line 14), the piston 56 is displaced sufficiently to uncover high pressure bypass port 90 to dump fluid from volume 60 through line 88 to the low pressure supply line 36 to pump 12. This acts to maintain the pressure drop across the metering valve 16 constant. However, as the piston 56 is displaced into the low pressure volume 62, the resistive force of the spring 70 increases.

To compensate for this, as the spring 70 is compressed and its resistive force increases, it urges against the diaphragm 74 to deflect the diaphragm and adjusting screw 78 toward the orifice 84. The closer the adjusting screw 78 comes to the face of the orifice facing the low pressure volume 62, the smaller the effective opening of the orifice 84 becomes. This restricts flow through the orifice between the high and low pressure volumes 60, 62 and acts to increase the pressure differential across the piston face 58. This increased pressure differential therefore increases with increasing spring force.

Conversely, as the piston 56 is displaced into the high pressure volume 60, the force exerted on flexible diaphragm 74 by spring 70 decreases, thereby allowing the diaphragm to resume its initial state (as shown in FIG. 2), which increases the effective size of the orifice 84. This allows fluid to flow from the high pressure volume 60 to the low pressure volume 62 (and from low pressure volume 62 through line 66 and orifice 68 to low pressure feed line 18). By decreasing the pressure differential across the face 58 of piston 56, the force acting against the piston is decreased as the force of spring 70 decreases.

Consequently, with appropriate adjustment of screw 78, the pressure differential across piston head 58 between the high and low pressure volume 60, 62 will vary with the variations in the force of spring 70, resulting in a pressure differential across the metering valve 16 which is essentially constant throughout the range of movement of the bypass valve 56. As a result, the bypass valve 50 possesses operating characteristics which are superior to prior art bypass valves such as valve 20 shown in FIG. 1.

It should be noted that the pressure within low pressure volume 62 typically is greater than the pressure in low pressure supply line 18 by virtue of the orifice 68. Consequently, the pressure within the low pressure volume 62 is permitted to vary in order to compensate for the variation of spring force, while the pressure within low pressure supply line 18 is allowed to remain constant. In conclusion, the valve droop that normally occurs in prior art devices is eliminated.

An additional benefit of the design of valve 50 is that it provides a measure of damping of piston movement, since such movement is accompanied by fluid flow through a restrictive orifice 68.

In the preferred embodiment shown, the diaphragm 74 is made of spring steel. However, the diaphragm may comprise a bimetal belleville washer which could change in performance characteristics to compensate for temperature variations.

While the form of apparatus herein described constitutes a preferred embodiment of the invention, it is to be understood that the invention is not limited to this precise form of apparatus and that changes may be made therein without departing from the scope of the invention.

What is claimed is:

1. For use with a fluid metering system having a high pressure fluid supply line, a metering valve connected to said high pressure supply line, and a low pressure supply line connected to said metering valve, a bypass valve for maintaining a constant pressure differential across said metering valve comprising:

a valve body defining a valve chamber;

a piston slidably mounted in said valve chamber and dividing said chamber into high pressure and low pressure volumes, said piston having an orifice therethrough connecting said high and low pressure volumes, said high pressure volume communicating with said high pressure line and said low pressure volume communicating with said low pressure line;

bypass line means connecting said high pressure volume to a low pressure fluid source, said bypass line means including a valve chamber connection positioned to be progressively uncovered by said piston as said piston slides toward said low pressure volume;

resilient means urging said piston toward said high pressure volume against high pressure fluid pressure from said high pressure line to cover and shut off said valve chamber connection; and means, responsive to a force of said resilient means, for progressively closing said piston orifice in response to increasing force applied by said resilient means against said piston such that a pressure differential across said piston varies with said resilient means force, thereby compensating for variations in said resilient means force with position of said piston in said chamber.

2. The bypass valve of claim 1 wherein said responsive means comprises a diaphragm spring mounted on said piston in said low pressure volume and positioned to deflect toward and away from said piston orifice, thereby effectively varying a size of said orifice.

3. The bypass valve of claim 2 wherein said resilient means urges against said diaphragm spring, whereby said diaphragm spring is urged to close said orifice and increase said pressure differential progressively as said resilient means is compressed.

4. The bypass valve of claim 3 wherein said resilient means includes means for adjusting a force of said spring.

5. The bypass valve of claim 2 wherein said responsive means includes means for adjusting clearance between said diaphragm spring and said orifice.

6. The bypass valve of claim 1 wherein said low pressure volume includes means for restricting flow of fluid therefrom to said low pressure line, thereby allowing a pressure differential to exist between fluid in said low pressure volume and fluid in said low pressure line.

7. The bypass line of claim 1 further comprising a chip screen covering said orifice on a high pressure volume side of said piston.

8. A bypass valve for use with a fuel metering system which includes a metering valve, the bypass valve including a valve body having a piston slidably mounted therein and dividing said body into high and low pressure volumes communicating with high and low pressure lines connected to said metering valve, spring means in said low pressure volume urging said piston into said high pressure volume, a bypass line connected to said body at a port communicating with said high pressure volume such that said piston progressively uncovers said port as said piston is displaced to spring means, and means for compensating for variation in a force of said spring means, said compensating means comprising:

said piston having an orifice therethrough interconnecting said high and low pressure volumes; and diaphragm means mounted on said piston and seated against said spring means, said diaphragm means being positioned to deflect and thereby progressively close said orifice as said spring means is compressed, whereby a pressure differential across said piston is increased.

* * * * *

UNITED STATES PATENT AND TRADEMARK OFFICE
CERTIFICATE OF CORRECTION

PATENT NO. : 5,078,173
DATED     : January 7, 1992
INVENTOR(S) : William R. Spencer and Elias L. Levine It is certified that error appears in the above-identified patent and that said Letters Patent is hereby corrected as shown below:

Column 4, line 9, delete "screen".

Column 4, line 9, add --screen-- between "catcher" and "86".

Signed and Sealed this

Twenty-ninth Day of June, 1993

Attest:

MICHAEL K. KIRK

Attesting Officer        Acting Commissioner of Patents and Trademarks